United States Patent
Gundlach et al.

(10) Patent No.: US 12,153,455 B2
(45) Date of Patent: Nov. 26, 2024

(54) FLOW RATE RATIO CONTROL DEVICE, CONTROL PROGRAM FOR A FLOW RATE RATIO CONTROL DEVICE AND CONTROL METHOD FOR A FLOW RATE RATIO CONTROL DEVICE

(71) Applicant: HORIBA STEC, Co., Ltd., Kyoto (JP)

(72) Inventors: Maximilian Gundlach, Reno, NV (US); Ryan Owens, Reno, NV (US); Thomas Hoke, Stateline, NV (US)

(73) Assignee: HORIBA STEC, Co., Ltd., Kyoto (JP)

( * ) Notice: Subject to any disclaimer, the term of this patent is extended or adjusted under 35 U.S.C. 154(b) by 359 days.

(21) Appl. No.: 17/451,981

(22) Filed: Oct. 22, 2021

(65) Prior Publication Data
US 2022/0129020 A1    Apr. 28, 2022

(30) Foreign Application Priority Data
Oct. 23, 2020  (JP) .................................. 2020-177842

(51) Int. Cl.
G05D 7/06       (2006.01)
G01F 15/00      (2006.01)
G05D 11/13      (2006.01)

(52) U.S. Cl.
CPC ......... G05D 7/0664 (2013.01); G01F 15/005 (2013.01); G05D 11/132 (2013.01)

(58) Field of Classification Search
CPC .. G05D 7/0664; G05D 11/132; G05D 7/0635; G05D 11/131; G01F 15/005
See application file for complete search history.

(56) References Cited

U.S. PATENT DOCUMENTS

| | | | | |
|---|---|---|---|---|
| 4,150,546 | A | * 4/1979 | Collett | G21D 3/14 376/241 |
| 2006/0237063 | A1 | * 10/2006 | Ding | G05D 11/132 137/487.5 |
| 2014/0053912 | A1 | * 2/2014 | Gregor | C23C 16/45561 137/12 |
| 2019/0204857 | A1 | 7/2019 | Yasuda et al. | |

FOREIGN PATENT DOCUMENTS

NO    2018047644 A1    3/2018

* cited by examiner

*Primary Examiner* — Chad G Erdman
(74) *Attorney, Agent, or Firm* — Alleman Hall & Tuttle LLP (57) ABSTRACT

A flow rate ratio control device smoothly switches branches without generating abrupt changes in the flow rates of a fluid flowing therethrough. The device includes at least two branches from a main flow path, first and second fluid control valves each including a position sensor for a valve body, a storage unit that stores reference positions of the valve bodies in order to divide the fluid flowing into the branches at predetermined ratios, and a control unit that controls the ratios of the branches by performing position control to place the valve body of the first valve in the reference position, and by performing flow rate control to set the flow rate of the second valve to a target flow rate. When the valve body of the second valve reaches the reference position, the control unit switches the position control and flow rate control between the valves.

5 Claims, 4 Drawing Sheets

FLOW RATE RATIO CONTROL DEVICE, CONTROL PROGRAM FOR A FLOW RATE RATIO CONTROL DEVICE AND CONTROL METHOD FOR A FLOW RATE RATIO CONTROL DEVICE

TECHNICAL FIELD

The present invention relates to a flow rate ratio control device that controls flow rate ratios of a fluid flowing through a plurality of branch flow paths that branch off from a main flow path, and to a control program used in this flow rate ratio control device, and a control method for this flow rate ratio control device.

TECHNICAL BACKGROUND

As a conventional flow rate ratio control device (also known as a flow splitter), as is shown, for example, in Patent Document 1, a structure in which fluid control valves are provided on each one of a plurality of branch flow paths that branch off from a main flow path, and flow rate ratios of a fluid flowing through the plurality of branch flow paths are controlled by performing flow velocity control on the fluid control valve located on the branch flow path having the greatest flow rate, and performing flow rate control on the fluid control valves on the other branch flow paths may be considered.

DOCUMENTS OF THE PRIOR ART

Patent Documents

Patent Document 1
  International Patent Publication No. 2018/047644

DISCLOSURE OF THE INVENTION

Problems to be Solved by the Invention

In the above-described flow rate ratio control device, controlling the flow rate ratios of the fluid flowing through the plurality of branch flow paths by placing the fluid control valve located on the branch flow path having the greatest flow rate (hereinafter, referred to as fluid control valve A) in a fully open state, and then performing flow rate control on the fluid control valves located on the other branch flow paths (hereinafter, referred to as fluid control valves B) may be considered. In this structure, because it is sufficient simply to place the fluid control valve A in a fully open state, valve control can be performed easily.

Here, in a case in which the branch flow path having the greatest flow rate is to be switched, gradually increasing the flow rates of the fluid control valves B so that the fluid control valves B are placed in a fully open state, and thereafter switching the fluid control valve A to flow rate control while maintaining the fluid control valves B in the fully open state may be considered. In other words, both the fluid control valve A and the fluid control valves B are placed in a fully open state at the timing when the branch flow path having the greatest flow rate is switched.

However, due to the different conductance in each of the plurality of branch flow paths, even if fluid control valves A and B are both in a fully open state, the flow rates in the plurality of branch flow paths will not be evenly divided. Therefore, a problem arises wherein the switching of the branch flow path having the greatest flow path (the switching point) does not occur in a state in which the flow rates in each of the plurality of branch flow paths are equal. Moreover, individual differences and the like exist in the fluid control valves provided on the plurality of branch flow paths so that even if drive signals (i.e., voltage signals) whose purpose is to place these fluid control valves in a fully open state are input, it is not certain that the flow rates will be the same in all the branch flow paths. In this case, when switching the branch flow path having the greatest flow rate to another branch flow path, abrupt changes (i.e., spikes) are generated in the flow rates of the fluid flowing through the branch flow paths, and the problem arises that the switching of the branch flow paths cannot be performed smoothly. As a result, defects occur in cases in which a flow rate ratio control device that performs the above-described control is used, for example in a semiconductor manufacturing process or the like.

The present invention was conceived in order to solve the above-described problems, and it is a principal object thereof to enable smooth switching of the branch flow paths to be performed when a branch flow path having the greatest flow rate is switched in a flow rate ratio control device, without any abrupt changes (i.e., spikes) being generated in the flow rates of a fluid flowing through the branch flow paths, and to ensure that the switch occurs in a state in which the flow rates of the plurality of branch flow paths are equal.

Means for Solving the Problem

In other words, a flow rate ratio control device according to the present invention is characterized in being provided with at least a first and a second branch flow path that branch off from a main flow path, a first fluid control valve that is provided on the first branch flow path and includes a position sensor that detects a position of a valve body, a second fluid control valve that is provided on the second branch flow path and includes a position sensor that detects a position of a valve body, a storage unit that stores reference positions of the valve bodies in order to divide the flow rate of the fluid flowing through the main flow path between the first branch flow path and the second branch flow path at predetermined flow rate ratios in each of the fluid control valves, and a flow rate ratio control unit that controls flow rate ratios of at least the first and second branch flow paths by performing position control of the first fluid control valve such that a position of the valve body thereof is placed in the reference position, and by performing flow rate control of the second fluid control valve such that the flow rate thereof reaches a target flow rate, wherein, when the valve body of the second fluid control valve whose flow rate is to be controlled reaches the reference position, the flow rate ratio control unit switches the position control and the flow rate control of each of the fluid control valves, and performs position control of the second fluid control valve such that the valve body thereof is placed in the reference position, and performs flow rate control of the first fluid control valve such that the flow rate thereof reaches a target flow rate.

According to this type of flow rate ratio control device, because valve body reference positions that are used to divide the flow rate of the fluid flowing through the main flow path between the first branch flow path and the second branch flow path at predetermined flow rate ratios in each of the fluid control valves are stored, and the first fluid control valve and second fluid control valve are switched based on these reference positions, it is possible for branch flow paths to be switched smoothly without any abrupt changes (i.e., spikes) being generated in the flow rates of a fluid flowing through the branch flow paths, and to ensure that the switch occurs in a state in which the flow rates of the plurality of branch flow paths are equal.

In detail, by normalizing the reference positions of the valve bodies in the fluid control valves in each of the plurality of branch flow paths based on the reference position of the valve body in the fluid control valve in the branch flow path with the lowest conductance, when switching the branch flow path having the greatest flow rate to another branch flow path in the flow rate ratio control device, switching can occur in a state in which the flow rates in each of the plurality of branch flow paths are equal. Furthermore, via such normalization, it is possible to maintain the lowest possible differential pressure throughout the device, and it is possible to minimize the arrival time of the gas supply from the flow rate ratio control device to, for example, a process chamber. Moreover, according to the present invention, because it is possible to normalize the conductance of the path from the fluid control valves in the plurality of branch flow paths to, for example, a process chamber, it is possible to cancel system variation caused by downstream components such as showerheads in the chamber or filters in the flow paths.

As a specific example of an operation of a flow rate ratio control device, continuously switching the branch flow path through which a fluid is flowing from the first branch flow path to the second branch flow path without changing the flow rate of the fluid flowing through the main flow path may be considered. In this case, it is desirable that, when the flow rate ratio control unit gradually displaces the valve body of the second fluid control valve whose flow rate is being controlled in order to change this valve body from a fully closed position to the reference position and the position of the valve body arrives at this reference position, the position control and the flow rate control of each of the fluid control valves be switched, and that position control be performed on the second fluid control valve such that the valve body thereof is placed in the reference position, and that flow rate control be performed on the first fluid control valve such that the flow rate therein is gradually reduced to zero.

More specifically, obtaining the predetermined flow rate ratios by dividing the flow rate of the fluid flowing through the main flow path equally between the first branch flow path and the second branch flow path may be considered. In this case, it is desirable that the reference position be a position that has been set as a fully open position of the fluid control valve.

It is also desirable that the first fluid control valve form a first fluid control device in combination with a flow rate sensor that is provided on the first branch flow path, and that the second fluid control valve form a second fluid control device in combination with a flow rate sensor that is provided on the second branch flow path.

Moreover, a control program for a flow rate ratio control device according to the present invention is a control program that is used in a flow rate ratio control device that is provided with at least a first and a second branch flow path that branch off from a main flow path, a first fluid control valve that is provided on the first branch flow path and includes a position sensor that detects a position of a valve body, and a second fluid control valve that is provided on the second branch flow path and includes a position sensor that detects a position of a valve body, and that enables a computer to perform functions of a storage unit that stores reference positions of the valve bodies in order to divide the flow rate of the fluid flowing through the main flow path between the first branch flow path and the second branch flow path at predetermined flow rate ratios in each of the fluid control valves, and of a flow rate ratio control unit that controls flow rate ratios of at least the first and second branch flow paths by performing position control of the first fluid control valve such that the valve body thereof is placed in the reference position, and by performing flow rate control of the second fluid control valve such that the flow rate thereof reaches a target flow rate, and, when the valve body of the second fluid control valve whose flow rate is to be controlled reaches the reference position, the flow rate ratio control unit switches the position control and the flow rate control of each of the fluid control valves, and performs position control of the second fluid control valve such that the valve body thereof is placed in the reference position, and performs flow rate control of the first fluid control valve such that the flow rate thereof is set to a target flow rate. By installing this type of control program in an existing flow rate ratio control device, the same type of functions as those performed by the above-described flow rate ratio control device of the present invention can be demonstrated.

Moreover, a control method for a flow rate ratio control device according to the present invention is a control method for a flow rate ratio control device that is provided with at least a first and a second branch flow path that branch off from a main flow path, a first fluid control valve that is provided on the first branch flow path and includes a position sensor that detects a position of a valve body, and a second fluid control valve that is provided on the second branch flow path and includes a position sensor that detects a position of a valve body, and includes a storage step in which reference positions of the valve bodies are stored in order to divide the flow rate of the fluid flowing through the main flow path between the first branch flow path and the second branch flow path at predetermined flow rate ratios in each of the fluid control valves; and a flow rate ratio control step in which flow rate ratios of at least the first and second branch flow paths are controlled as a result of position control being performed on the first fluid control valve such that the valve body thereof is placed in the reference position, and of flow rate control being performed on the second fluid control valve such that the flow rate thereof is set to a target flow rate, and, in the flow rate ratio control step, when the valve body of the second fluid control valve whose flow rate is being controlled reaches the reference position, the position control and flow rate control of each of the fluid control valves are switched, and position control is performed on the second fluid control valve such that the valve body thereof is placed in the reference position, and flow rate control is performed on the first fluid control valve such that the flow rate thereof is set to a target flow rate.

Effects of the Invention

According to the above-described present invention, when switching a branch flow path having the greatest flow rate in a flow rate ratio control device, it is possible to switch the branch flow paths smoothly without any abrupt changes (i.e., spikes) being generated in the flow rates of a fluid flowing through the branch flow paths, and to ensure that the switch occurs in a state in which the flow rates of the plurality of branch flow paths are equal.

BEST EMBODIMENTS FOR IMPLEMENTING THE INVENTION

Hereinafter, a flow rate ratio control device according to an embodiment of the present invention will be described with reference to the drawings.

1. Device Structure

Figure 1:
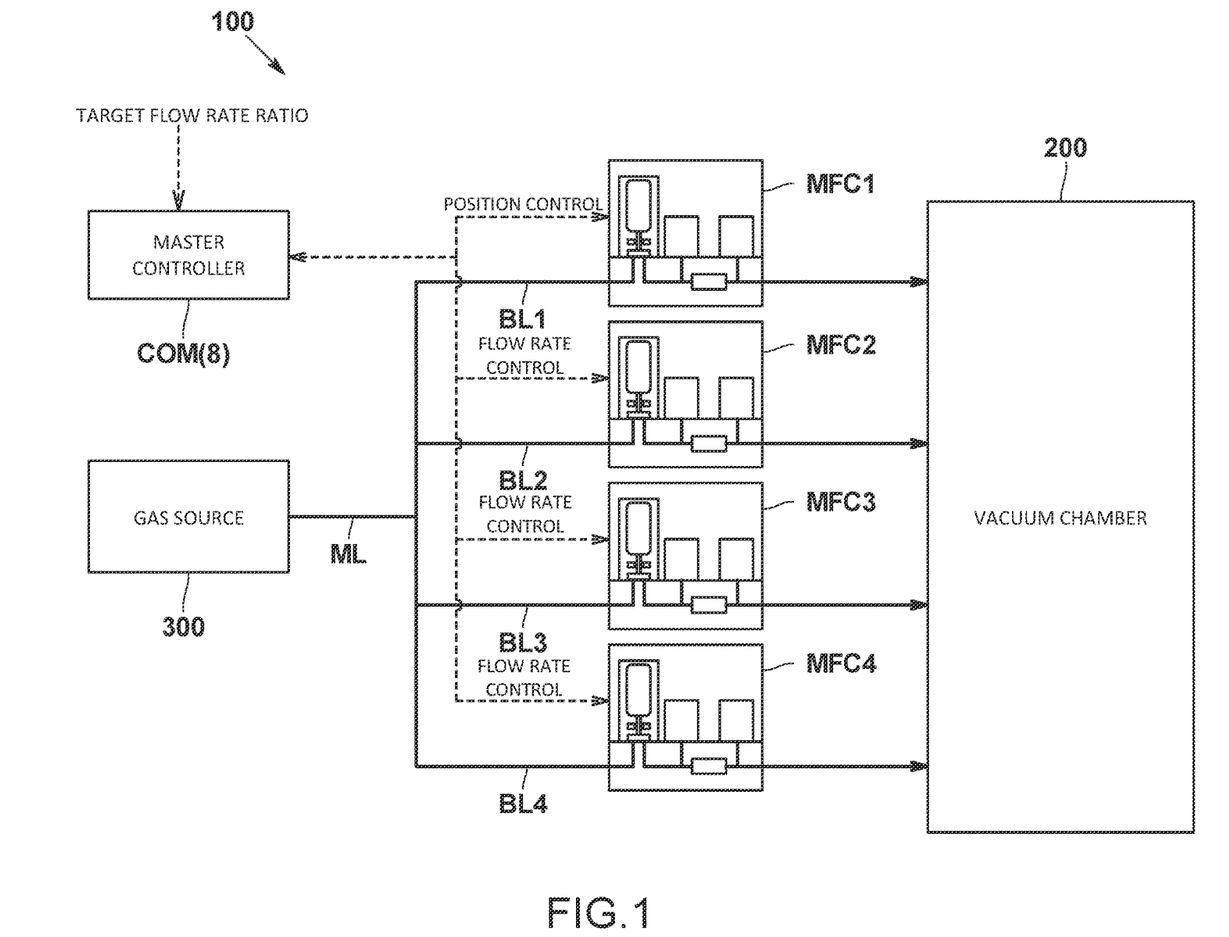
FIG. 1 is an overall schematic view of a flow rate ratio control device according to an embodiment of the present invention.

As is shown in FIG. 1, a flow rate ratio control device 100 of the present embodiment is used, for example, in a semiconductor manufacturing process, and is used inside a vacuum chamber 200, which houses wafers, in order to introduce a gas that is used in the semiconductor manufacturing process into a plurality of intake ports of the vacuum chamber 200 at flow rate ratios that have been determined respectively for each intake port.

More specifically, the flow rate ratio control device 100 is provided with a main flow path ML, a plurality of branch flow paths BL1 to BL4 that branch off from the main flow path L1, a plurality of fluid control devices MFC1 to MFC4 that are provided respectively on the plurality of branch flow paths BL1 to BL4, and a master controller COM that collectively controls the plurality of fluid control devices MFC1 to MFC4. The flow rate ratio control device 100 is formed so as to perform control such that the flow rate ratios of a gas flowing through the respective branch flow paths BL1 to BL4 are set to target flow rate ratios.

A starting end of the main flow path ML, which is on the upstream-side thereof, is connected to a gas source 300 that supplies a gas used for semiconductor processing, while the plurality of branch flow paths BL1 to BL4 are connected to a terminating end of the main flow path ML, which is on the downstream-side thereof. In FIG. 1, an example is shown in which four branch flow paths BL1 to BL4 are connected, however, provided that there are two or more branch flow paths BL, the number thereof is not particularly restricted.

Figure 2:
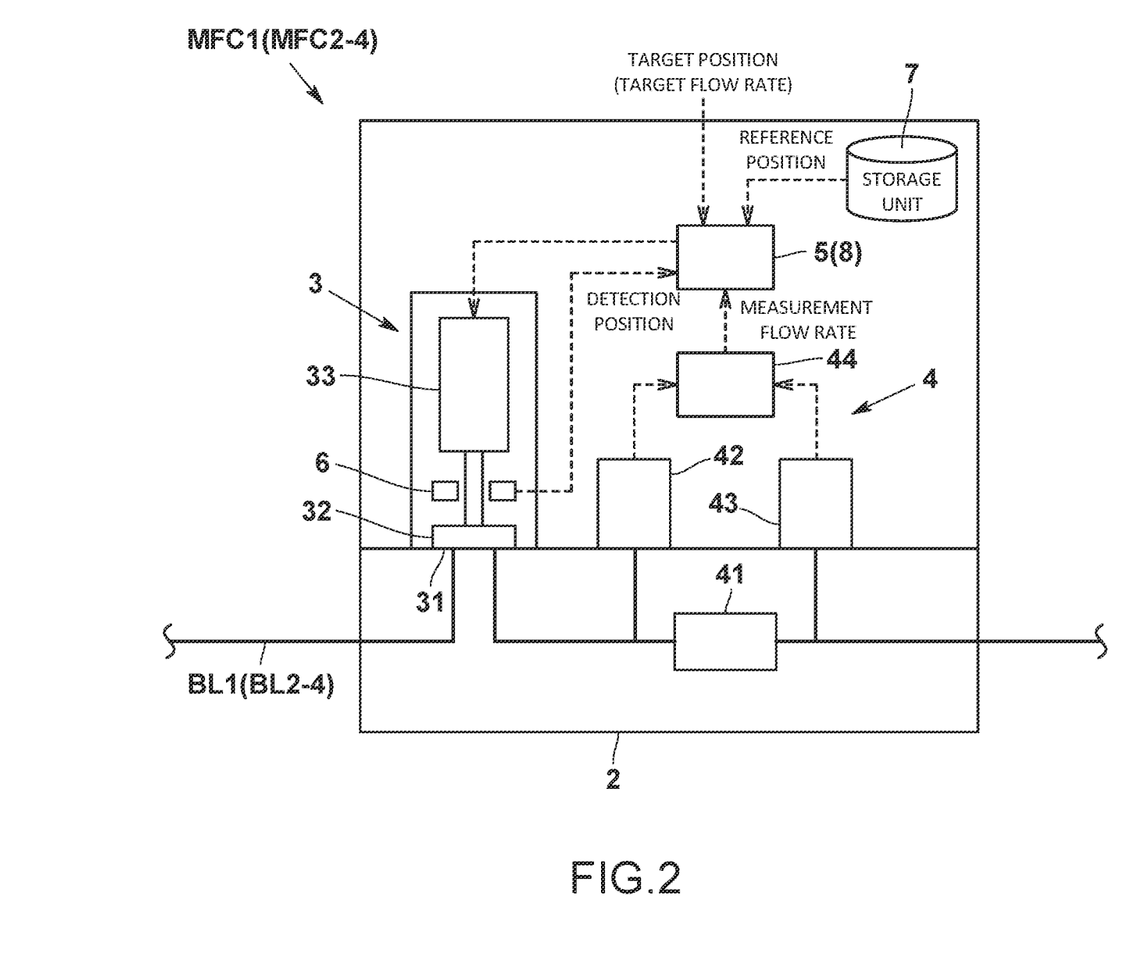
FIG. 2 is a schematic view showing a flow rate control device of the same embodiment.

Each of the fluid control devices MFC1 to MFC4 is formed by what is commonly known as a mass flow controller and, as is shown in FIG. 2, is provided with a block 2 in which is formed an internal flow path that communicates with the branch flow paths BL1 to BL4, a fluid control valve 3 that is provided in the block 2 and is used to control the flow rate in the internal flow path, a flow rate sensor 4 that is provided in the block 2 on the upstream side or the downstream side from the fluid control valve 3 on the internal flow path, and a valve control unit 5 that controls the fluid control valve 3. Note that, in the following description, in cases in which it is necessary to discriminate between component parts of the respective fluid control devices MFC1 to MFC4, they will be referred to as a 'first fluid control valve 31' or a 'second fluid control valve 32' or the like.

The fluid control valve 3 includes a valve seat 31 that is provided partway along the internal flow path, a valve body 32 that moves towards or away from the valve seat 31, and an actuator 33 that is formed, for example, by a piezo element and causes the valve body 32 to move. Note that the fluid control valve 3 may be a normally open type valve which is in a fully open state when the actuator 33 is not being driven, or may be a normally closed type valve which is in a fully closed state when the actuator 33 is not being driven.

The fluid control valve 3 additionally has a position sensor 6 that detects the position of the valve body 32 relative to the valve seat 31. The position sensor 6 is, for example, an eddy current type, non-contact displacement sensor. Detection positions acquired by this position sensor 6 are output to the valve control unit 5.

The flow rate sensor 4 is, for example, a pressure type sensor, and includes a laminar flow element 41 that is provided on the internal flow path, an upstream-side pressure sensor 42 that detects pressure on the upstream side from the laminar flow element 41, a downstream-side pressure sensor 43 that detects pressure on the downstream side from the laminar flow element 41, and a flow rate output circuit 44 that outputs flow rates based on detection pressures detected by the respective pressure sensors 42 and 43. In addition, the flow rate output circuit 44 calculates the flow rate of a fluid from a differential pressure between the detection pressure detected by the upstream-side pressure sensor 42 and the detection pressure detected by the downstream-side pressure sensor 43, and outputs the calculated flow rate to the valve control unit 5. Note that a thermal type sensor may be used as the flow rate sensor 4.

The valve control unit 5 performs flow rate control and position control of the fluid control valve 3 based on commands from the master controller COM. Moreover, in cooperation with the master controller COM, the valve control unit 5 additionally performs functions of a flow rate ratio control unit 8 (described below).

In a case in which the valve control unit 5 performs flow rate control of the fluid control valve 3, based on a deviation between a target position for achieving a previously set target flow rate and a detected position detected by the position sensor 6, the valve control unit 5 performs flow rate feedback control (i.e., implements a flow rate control mode) such that this deviation is reduced. In this case, on the basis of a deviation between the target position and the detected position, valve control unit 5 controls the applied voltage to the fluid control valve 3 such that the detected position of the position sensor 6 becomes the target position. Moreover, it's also possible for the valve control unit 5 to, based on deviation between a previously set target flow rate and a measured flow rate measured by the flow rate sensor 4, perform flow rate feedback control to minimize the deviation. In this case, the valve control unit 5 calculates a target valve opening based on the deviation between the target flow rate and the measurement flow rate, and controls the applied voltage to the fluid control valve 3 such that the valve opening acquired by the position sensor 6 is set to the target valve opening.

Moreover, in a case in which the valve control unit 5 performs position control of the fluid control valve 3, based on a deviation between a previously set target position and a detected position detected by the position sensor 6, the valve control unit 5 performs position feedback control (i.e., implements a position control mode) such that this deviation is reduced. In other words, in a case in which the valve control unit 5 performs position control of the fluid control valve 3, the valve control unit 5 does not perform the feedback control using measurement flow rates measured by the flow rate sensor 4.

In the present embodiment, the valve control unit 5 of the fluid control device MFC1 that is provided on the master line, which is the branch flow path having the greatest target flow rate ratio (here, this is the first branch flow path BL1), operates in position control mode. In contrast, the valve control units 5 of the fluid control devices MFC2 to MFC4 that are provided on the slave lines, which are the branch flow paths other than the master line, namely, the branch flow paths BL2 to BL4, operate in flow rate control mode.

Here, a target position in the position control mode will be described.

The flow rate ratio control device 100 of the present embodiment includes a storage unit 7 that stores reference positions for the valve body 32 that enable the flow rate of the fluid flowing through the main flow path to be divided at predetermined flow rate ratios between the plurality of branch flow paths BL1 to BL4 in each of the fluid control valves 3. Note that, as is shown in FIG. 2, a storage unit 7 may be provided individually in a memory of each of the fluid controllers MFC1 to MFC4, or alternatively, an overall storage unit 7 for all of the fluid controllers MFC1 to MFC4 may be provided in the memory of the master controller COM.

Reference positions for the valve body 32 that enable the flow rate of the fluid flowing through the main flow path to be divided at predetermined flow rate ratios between the plurality of branch flow paths BL1 to BL4 in each of the fluid control valves 3 are stored in the storage unit 7. Here, the reference positions for the valve body 32 that are set in each fluid control valve 3 are positions that are set as fully open positions of the fluid control valves 3. Additionally, these reference positions form the target positions in the position control mode.

In the present embodiment, the predetermined flow rates ratios are obtained by dividing the flow rate of the fluid flowing through the main flow path ML (for example, 4 L) equally between the plurality of branch flow paths BL1 to BL4 (so that the flow rate of each of the branch flow paths BL1 to BL4 is 1 L).

2. Reference Position Setting Method

Figure 3:
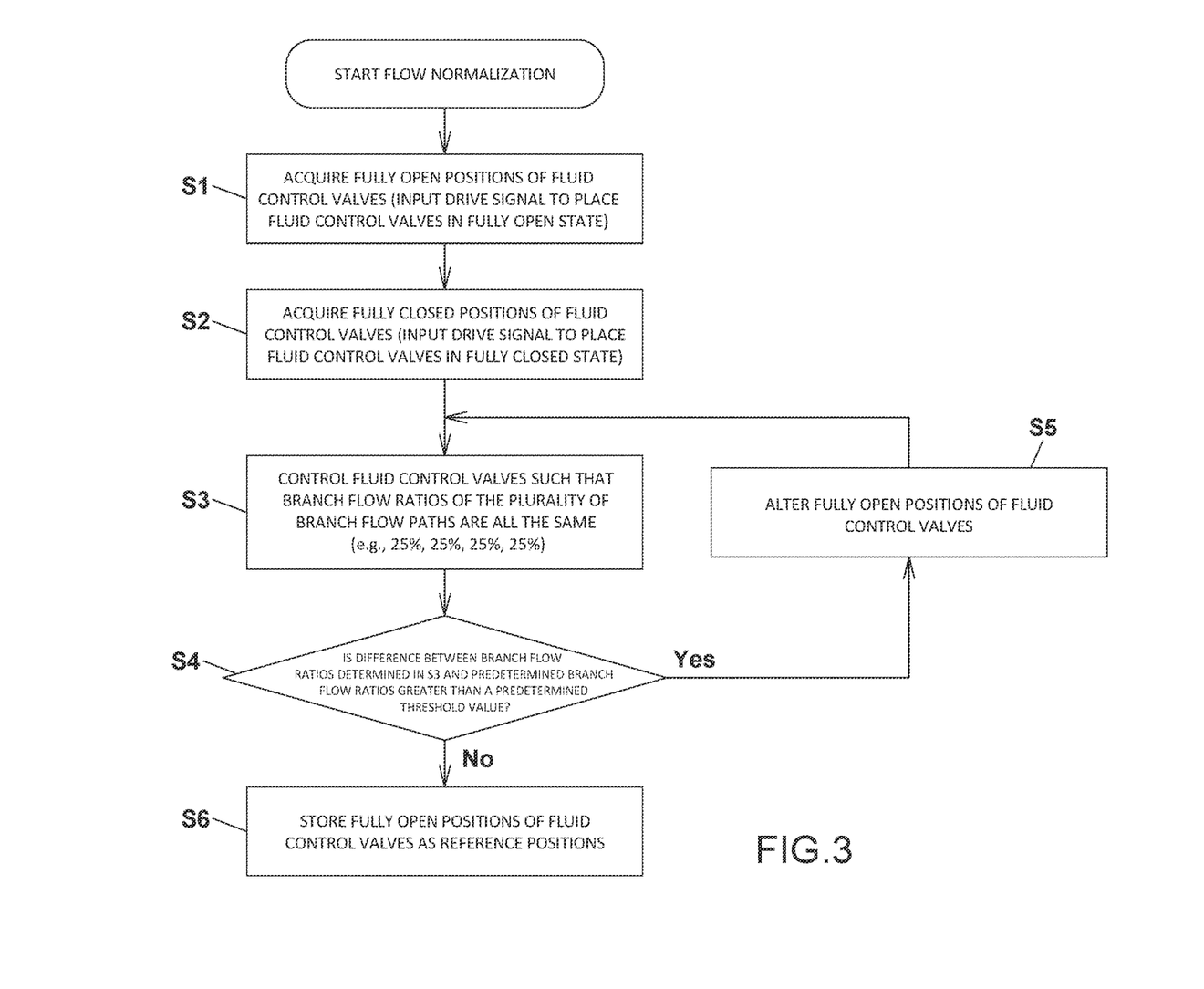
FIG. 3 is a view showing a flow normalization procedure of the same embodiment.

Here, as is shown in FIG. 3, the reference positions are determined in advance via, for example, the flow normalization procedure described below, and are then stored in the storage unit 7 in the respective fluid control valves 3.

A drive signal (i.e., a voltage signal) is input into each of the plurality of fluid control valves 3 that are provided on the first through fourth branch flow paths BL1 to BL4 in order to physically place each fluid control valve 3 in a fully open state, and the positions (i.e., the fully open positions) of the valve bodies 32 detected by the position sensor 6 at that time are acquired (step S1).

Moreover, a drive signal (i.e., a voltage signal) is input into each of the plurality of fluid control valves 3 that are provided on the first through fourth branch flow paths BL1 to BL4 in order to physically place each fluid control valve 3 in a fully closed state, and the positions (i.e., the fully closed positions) of the valve bodies 32 detected by the position sensor 6 at that time are acquired (step S1).

Next, the fluid control valves 3 are placed in the fully open state such that branch flow ratios of the fluid flowing through the first through fourth branch flow paths BL1 to BL4 become predetermined branch flow ratios (in this case, each branch flow ratio is the same (i.e., each is 25%)), and the branch flow ratios of the fluid flowing through the first through fourth branch flow paths BL1 to BL4 at that time are determined (step S3).

The branch flow ratios determined via step S3 and the predetermined branch flow ratios are then mutually compared (step S4), and in a case in which the difference between them is greater than a predetermined threshold value, the fully open position of one of the fluid control valves 3 out of the plurality of fluid control valves 3 provided on the first through fourth branch flow paths BL1 to BL4 is altered (step S5). For example, the fully open position of the fluid control valve 3 that is provided on the branch flow path having the greatest difference is altered.

Next, using the altered fully open position, the routine returns to step S3, and the fully open positions of the fluid control valves 3 are continuously altered until the differences between the branch flow ratios of the fluid flowing through the first through fourth branch flow paths BL1 to BL4 and the predetermined branch flow ratios become less than the predetermined threshold value. The fully open positions of each fluid control valve 3 determined via this routine are then stored in the storage unit 7 as reference positions (step S6).

The master controller COM then inputs commands into the respective fluid controllers MFC1 to MFC4 based on the target flow rate ratios for the gas flowing through the respective branch flow paths BL1 to BL4 received from a user, and causes the position control mode, which is employed in order for position control to be performed, to be executed in the fluid control device MFC1 that is provided on the branch flow path BL1 that is to become the master line, while also causing the flow rate control mode to be executed in the fluid control devices MFC2 to MFC4 that are provided on the other branch flow paths BL2 to BL4 by inputting into these fluid control devices MFC2 to MFC4 individual target flow rates calculated from the target flow rate ratios. Note that, by operating in mutual cooperation with each other, the master controller COM and the valve control units 5 of the respective fluid control devices MFC2 to MFC4 are able to perform the functions of the flow rate ratio control unit 8 described below.

At this time, the flow rate ratio control unit 8 controls the flow rate ratios of the plurality of branch flow paths BL1 to BL4 by performing position control, based on the detection positions detected by the position sensor 6, on the fluid control valve 3 of the fluid control device MFC1 that is provided on the branch flow path BL1 and that is to become the master line such that the position of the valve body 32 thereof is set to the reference position, and by performing flow rate control on the fluid control valves 3 of the fluid control devices MFC2 to MFC4 that are provided on the branch flow paths BL2 to BL4 and that are to become the slave lines such that the flow rates thereof become the target flow rates.

3. Master Line Switching Operation

Next, a case in which the flow rate ratio control unit 8 continuously switches the branch flow having the largest target flow rate ratio (i.e., the master line) from the first branch flow path BL1 to the second branch flow path BL2 without changing the flow rate of the fluid flowing through the main flow path ML will be considered. Note that, here, a case is illustrated in which the switching is performed between the first branch flow path BL1 and the second branch flow path BL2, however, the same operation may be performed in cases in which the switching is performed between other branch flow paths.

Figure 4:
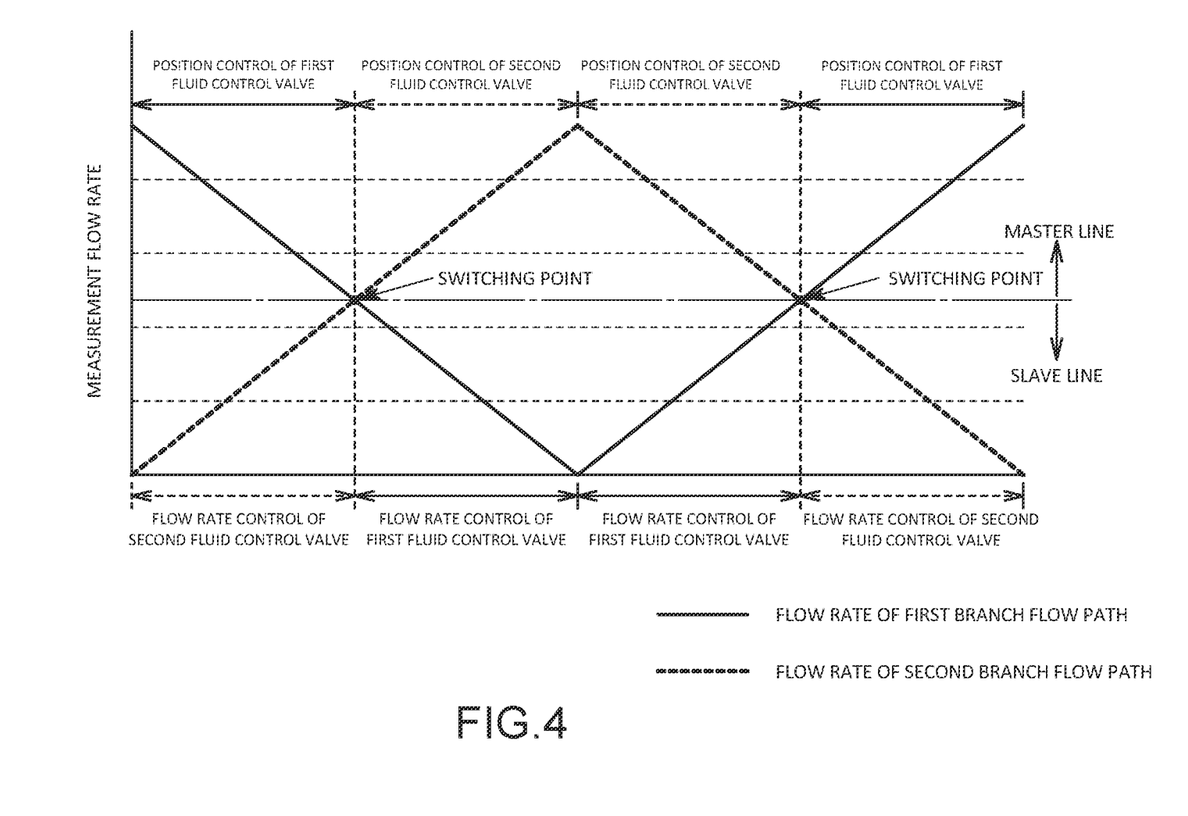
FIG. 4 is a schematic view showing control contents of a fluid control valve and flow rates of branch flow paths of the same embodiment.

In this case, as is shown in FIG. 4, the flow rate ratio control unit 8 gradually displaces the second fluid control valve 3 provided on the second branch flow path BL2 using the flow rate control mode such that the valve body 32 thereof changes from the fully closed position to the reference position. Here, the valve body 32 is gradually displaced in such a way that the flow rate of the fluid flowing through the second branch flow path BL2 increases rectilinearly.

When the position of the valve body 32 of the second fluid control valve 3, which is provided on the second branch flow path BL2, arrives at the reference position, the second fluid control valve 3 is switched from flow rate control to position control, and position control is performed on the second fluid control valve 3 such that the valve body 32 thereof is placed in the reference position. In addition, flow rate control is performed on the first fluid control valve 3, which is provided on the first branch flow path BL1, so that the flow rate of the fluid flowing through the first branch flow path BL1 is gradually reduced until it reaches zero. Here, the valve body 32 is gradually displaced in such a way that the flow rate of the fluid flowing through the first branch flow path BL1 decreases rectilinearly. Note that, in the operating sequence to continuously switch from the first branch flow path BL1 to the second branch flow path BL2, the flow rate of the fluid flowing through the first branch flow path BL1 decreases rectilinearly, while the flow rate of the fluid flowing through the second branch flow path BL2 increases rectilinearly. As a result, the branch flow path having the largest target flow rate ratio (i.e., the master line) is continuously switched from the first branch flow path BL1 to the second branch flow path BL2. Note that, in FIG. 4, a case is illustrated in which, after the master line has been switched from the 'first branch flow path BL1' to the 'second branch flow path BL2', the master line is switched back again from the 'second branch flow path BL2' to the 'first branch flow path BL1'.

Moreover, by performing a switching operation such as that shown in FIG. 4, it is possible to make a performance evaluation of the switching operation to switch between the branch flow paths BL1 and BL2 of the flow rate ratio control device 100. In other words, by determining whether or not abrupt changes (i.e., spikes) are occurring in the flow rates of the fluid flowing through the branch flow paths BL1 and BL2 at the point at which the mutual switching between the first branch flow path BL1 and the second branch flow path BL2 is performed, it is possible to evaluate the performance of the flow rate ratio control device 100.

4. Effects of the Present Embodiment

According to the flow rate ratio control device 100 of the present embodiment which is formed in the manner described above, because valve body reference positions that are used to enable the flow rate of the fluid flowing through the main flow path to be divided at predetermined flow rate ratios between the plurality of branch flow paths BL1 to BL4 in the respective fluid control valves 3 are stored, and switching between the first fluid control valve 3 and the second fluid control valve 3 is performed based on these reference positions, when the branch flow path having the largest flow rate in the flow rate ratio control device 100 is switched, the switch can be made in a state in which the flow rates in the plurality of branch flow paths BL1 to BL4 are equal, and it is possible to switch the branch flow paths smoothly without any abrupt changes (i.e., spikes) being generated in the flow rates of a fluid flowing through the branch flow paths BL1 and BL2.

In detail, by normalizing the reference position of the valve body 32 of the fluid control valve 32 in each of the plurality of branch flow paths BL1 to BL4 on the basis of the reference position of the valve body 32 of the fluid control valve 3 in the branch flow path with the lowest conductance of the plurality of branch flow paths BL1 to BL4, when the branch flow path having the largest flow rate in the flow rate ratio control device 100 is switched, the switch can be made in a state in which the flow rates in the plurality of branch flow paths BL1 to BL4 are equal. Additionally, via such normalization, it is possible to maintain the lowest possible differential pressure throughout the device, and it is possible to minimize the arrival time of the gas supply from the flow rate ratio control device 100 to, for example, a process chamber. Moreover, according to this embodiment, because it is possible to normalize the conductance of the path from the fluid control valves 3 in the plurality of branch flow paths BL1 to BL4 to, for example, a process chamber, it is possible to cancel system variation caused by downstream components such as showerheads in the chamber or filters in the flow paths.

For example, in a case in which, in the plurality of branch flow paths BL1 to BL4 that are connected to the vacuum chamber 200 that is used in a semiconductor manufacturing process, the master/slave relationship between the branch flow paths that are connected to a central portion of the vacuum chamber 200 and the branch flow paths that are connected to outer peripheral portions of the vacuum chamber 200 is switched, because this switching operation is able to be performed smoothly, it is possible to improve the quality of the semiconductor manufacturing process. Note that a case in which a transition is made, for example, from process control in which the flow rate to the outer peripheral portions of the vacuum chamber 200 is greater to purge control in which the flow rate to the central portions of the vacuum chamber 200 is greater serves as an example of a case when a switching of the above-described master/slave relationship is performed.

5. Additional Embodiments

Note that the present invention is not limited to the above-described embodiment.

The reference positions of the above-described embodiment are set to positions of the valve body 32 that enable flow rates having the same branch flow ratios (i.e., mutually equal branch flow rates) to be supplied, however, it is also possible for the reference positions to be set to positions of the valve body 32 that enable flow rates having mutually different branch flow ratios to be supplied. In other words, looking at the example shown in FIG. 4, instead of the reference positions being set to positions of the valve body 32 that enable flow rates in which the branch flow ratios of the first branch flow path BL1 and the second branch flow path BL2 are the same (i.e., 50:50) to be obtained, it is possible to alternatively set the reference positions to positions of the valve body 32 that enable flow rates in which the branch flow ratios of the first branch flow path BL1 and the second branch flow path BL2 are, for example, 49:51 or 52:48 or the like to be obtained. Moreover, it is also possible to set a width for the flow rate enabled by the reference position that enables the flow rate to remain within a range of resolution of the fluid control valve 3 (for example, 0.2% of full scale), and to set a width for the reference position by setting the reference position of the present embodiment as the position of the valve body 32 whose reference flow rate has this width. In other words, instead of setting a single point for the timing of the switching of the position control and flow rate control of the fluid control valve 3, it is also possible to set a width for the timing within which this switching can be performed.

Moreover, looking at the example shown in FIG. 4, it is also possible to set a width for the timing within which the control of the first branch flow path BL1 and the second branch flow path BL2 is switched. In this case, when switching the master line from the first branch flow path BL1 to the branch flow path BL2, once a period during which position control (or alternatively flow rate control) is performed on both the first fluid control valve 3 and the second fluid control valve 3 has ended, the first fluid control valve 3 undergoes flow rate control, and the second fluid control valve 3 undergoes position control.

Moreover, in the above-described embodiment, the fluid control device MFC is a packaged mass flow controller, however, it is also possible for other fluid control devices to be provided on the respective branch flow paths. For example, it is also possible to treat a fluid control valve and a flow rate sensor that are not packaged together like a mass flow controller as a fluid control device.

In the above-described embodiment, a structure is employed in which, based on a target flow rate ratio, position control is performed for the fluid control valve that is provided on the branch flow path in which the flow rate of the fluid is the greatest, however, it is also possible to employ a structure in which, for example, the branch flow path in which the flow rate of the fluid is the second or third greatest is used as the master line, and the other branch flow paths are used as slave lines, and position control is performed for the fluid control valve that is provided on the master line.

Furthermore, in the above-described embodiment, an example is given in which the flow rate ratio control device is used in a semiconductor manufacturing process, however, the flow rate ratio control device may also be used in other applications.

Furthermore, it should be understood that the present invention is not limited to the above-described embodiment, and that various modifications and the like may be made thereto insofar as they do not depart from the spirit or scope of the present invention.

DESCRIPTION OF THE REFERENCE CHARACTERS

100 . . . Flow Rate Ratio Control Device
ML . . . Main Flow Path
BL1~BL4 . . . Branch Flow Paths
3 . . . Fluid Control Valve
32 . . . Valve Body
6 . . . Position Sensor
7 . . . Storage Unit
8 . . . Flow Rate Ratio Control Unit

What is claimed is:

1. A flow rate ratio control device, comprising:
at least a first and a second branch flow path that branch off from a main flow path;
a first fluid control valve that is provided on the first branch flow path and includes a position sensor that detects a position of a valve body;
a second fluid control valve that is provided on the second branch flow path and includes a position sensor that detects a position of a valve body;
a memory that stores reference positions of the valve bodies in order to divide the flow rate of the fluid flowing through the main flow path between the first branch flow path and the second branch flow path at predetermined flow rate ratios in each of the fluid control valves; and
a flow rate ratio controller that controls flow rate ratios of at least the first and second branch flow paths by performing control of the first fluid control valve and control of the second fluid control valve, wherein
a flow rate sensor is provided in each of the first branch flow path and the second branch flow path;
the flow rate ratio controller is configured to switch between position control and flow rate control of each of the fluid control valves such that prior to the switch, the flow rate ratio controller simultaneously performs position control of the first fluid control valve such that the valve body thereof is placed in the reference position, and flow rate control of the second fluid control valve such that the flow rate thereof arrives at a target flow rate,
the switch occurs when the position of the valve body of the second fluid control valve whose flow rate is to be controlled reaches the reference position, and
after the switch, the flow rate ratio controller simultaneously performs position control of the second fluid control valve such that the valve body thereof is placed in the reference position, and flow rate control of the first fluid control valve such that the flow rate thereof reaches a target flow rate.

2. The flow rate ratio control device according to claim 1, wherein, when the flow rate ratio controller gradually displaces the valve body of the second control valve whose flow rate is being controlled in order to change this valve body from a fully closed position to the reference position, and the position of the valve body arrives at this reference position, the position control and the flow rate control of each of the fluid control valves are switched, and position control is performed on the second fluid control valve such that the valve body thereof is placed in the reference position, and flow rate control is performed on the first fluid control valve such that the flow rate therein is gradually reduced to zero.

3. The flow rate ratio control device according to claim 1, wherein the predetermined flow rate ratios are obtained by dividing the flow rate of the fluid flowing through the main flow path equally between the first branch flow path and the second branch flow path, and
the reference position is a position that has been set as a fully open position of the fluid control valve.

4. A non-transitory computer-readable storage medium storing a control program for a flow rate ratio control device that is provided in a flow rate ratio control device that includes at least a first and a second branch flow path that branch off from a main flow path, a first fluid control valve that is provided on the first branch flow path and includes a position sensor that detects a position of a valve body, a second fluid control valve that is provided on the second branch flow path and includes a position sensor that detects a position of a valve body, and a flow rate sensor provided in each of the first branch flow path and the second branch flow path, the control program being executable by a computer to:
store reference positions of the valve bodies in a memory in order to divide the flow rate of the fluid flowing through the main flow path between the first branch flow path and the second branch flow path at predetermined flow rate ratios in each of the fluid control valves; and
perform functions of a flow rate ratio controller that controls flow rate ratios of at least the first and second branch flow paths by performing control of the first fluid control valve and control of the second fluid control valve, wherein the flow rate ratio controller is configured to switch between position control and flow rate control of each of the fluid control valves such that prior to the switch, the flow rate ratio controller simultaneously performs position control of the first fluid control valve such that the valve body thereof is placed in the reference position, and flow rate control of the second fluid control valve such that the flow rate thereof is set to a target flow rate, the switch occurs when the valve body of the second fluid control valve whose flow rate is being controlled reaches the reference position, and after the switch, the flow rate ratio controller simultaneously performs position control of the second fluid control valve such that the position of the valve body thereof is placed in the reference position, and flow rate control of the first fluid control valve such that the flow rate thereof is set to a target flow rate.

5. A control method for a flow rate ratio control device that is provided in a flow rate ratio control device that includes at least a first and a second branch flow path that branch off from a main flow path, a first fluid control valve that is provided on the first branch flow path and includes a position sensor that detects a position of a valve body, a second fluid control valve that is provided on the second branch flow path and includes a position sensor that detects a position of a valve body, and a flow rate sensor provided in each of the first branch flow path and the second branch flow path, and that comprises:

a storage step in which reference positions of the valve bodies are stored in order to divide the flow rate of the fluid flowing through the main flow path between the first branch flow path and the second branch flow path at predetermined flow rate ratios in each of the fluid control valves; and a flow rate ratio control step in which flow rate ratios of at least the first and second branch flow paths are controlled as a result of performing control of the first fluid control valve and control of the second fluid control valve, wherein in the flow rate ratio control step, each of the fluid control valves are switched between position control and flow rate control such that prior to the switch, position control is performed on the first fluid control valve such that the valve body thereof is placed in the reference position, and simultaneously, flow rate control is performed on the second fluid control valve such that the flow rate thereof is set to a target flow rate, the switch occurs when the valve body of the second fluid control valve whose flow rate is being controlled reaches the reference position, and after the switch, position control is thereafter-simultaneously performed on the second fluid control valve such that the position of the valve body thereof is placed in the reference position, while flow rate control is performed on the first fluid control valve such that the flow rate thereof is set to a target flow rate.

* * * * *

UNITED STATES PATENT AND TRADEMARK OFFICE
CERTIFICATE OF CORRECTION

PATENT NO. : 12,153,455 B2
APPLICATION NO. : 17/451981
DATED : November 26, 2024
INVENTOR(S) : Maximilian Gundlach, Ryan Owens and Thomas Hoke It is certified that error appears in the above-identified patent and that said Letters Patent is hereby corrected as shown below:

In the Claims

Column 13 In Claim 5, Line 24, delete "thereafter-"

Signed and Sealed this
Eighteenth Day of March, 2025

Coke Morgan Stewart
*Acting Director of the United States Patent and Trademark Office*